Sept. 24, 1957 M. LORENZO Y GOMEZ 2,807,702
ELECTRIC HOT WATER HEATER
Filed Aug. 12, 1955 2 Sheets-Sheet 1
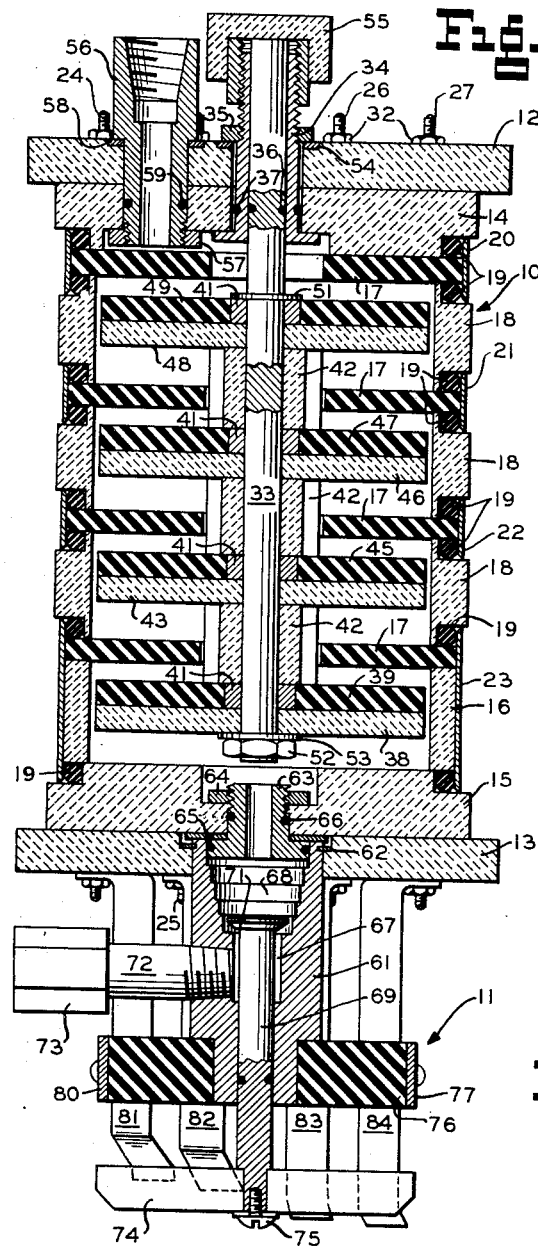
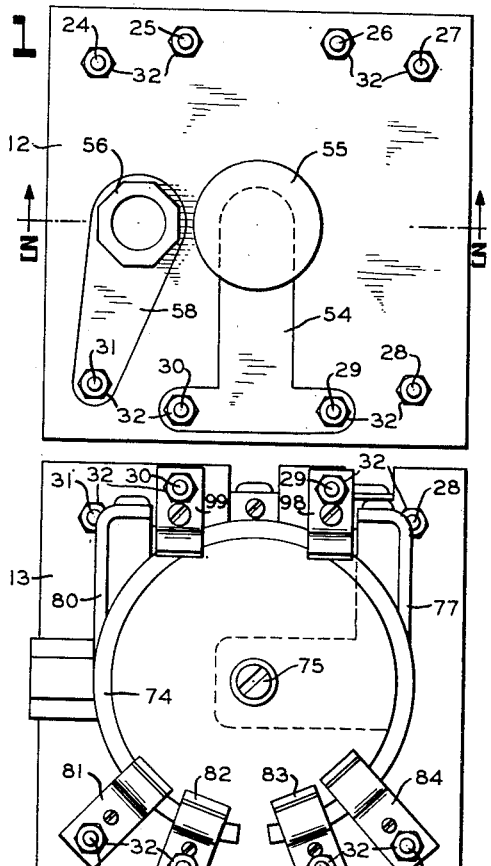
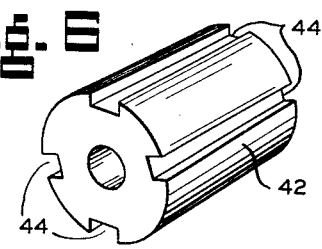
INVENTOR.
MANUEL LORENZO Y GOMEZ
BY
ATTORNEY

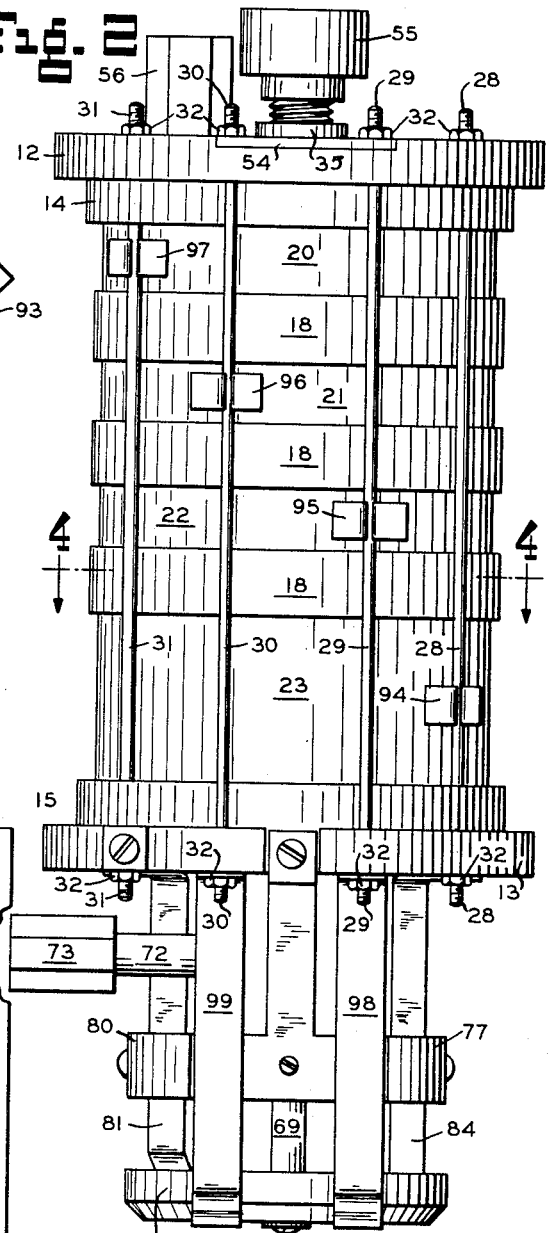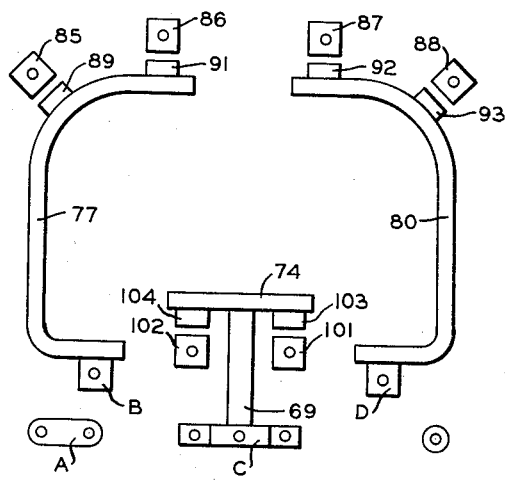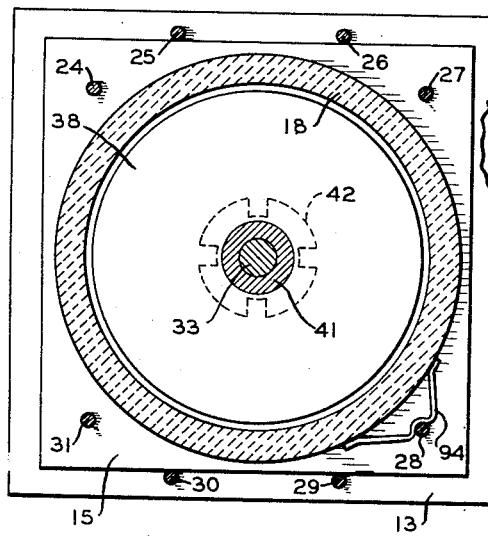
INVENTOR.
MANUEL LORENZO Y GOMEZ
BY
ATTORNEY

United States Patent Office 2,807,702
Patented Sept. 24, 1957

2,807,702

ELECTRIC HOT WATER HEATER

Manuel Lorenzo y Gomez, Havana, Cuba

Application August 12, 1955, Serial No. 528,026

12 Claims. (Cl. 219—40)

The present invention relates to apparatus for heating liquids and more particularly to a compact hot water heater for heating water by electrical conduction.

A hot water heater incorporating the features of this invention comprises a heating chamber through which the water to be heated, passes. The chamber may be of a general cylindrical construction and contains two sets of electrodes. In circulating through the chamber, the water contacts the two electrode groups and serves as a conductor through which the electric current flows. The current flow results in a heating of the water to a temperature dependent upon the magnitude of the current measured in amperes, the time of the current flow and the quantity of water passing through the heater in a given period of time.

The electrode groups are positioned in stacked relation and each comprises a plurality of carbon or electro-conductive disks which interleave with the carbon disks of the other group to provide a zig-zag path for the water passing through the heater. The flat disk construction of the electrodes also serves to provide a larger electrode area, thus giving the unit a greater heating capacity.

In a hot water heater of this type, the current drawn by the unit will be a function of the distance between the carbon electrodes. That is, as the gap between the electrodes increases, the resistance will increase and the current will decrease. Continuous use of the unit may cause erosion of the carbon electrodes resulting in a change of operating current. This erosion or wearing away of the electrodes is present and may be due to a number of different causes. The passage of the water over the outer surface of the carbon disks and the resulting friction will cause a wearing away of the carbon. Current burn from the flow of current between the disks will also have a wearing effect. In addition, the chemical composition of the water and reactions set up by the mineral content of hard waters along with the solvent effect of the water may wear the carbon electrode disks. Also, the heating action will cause continuous expansion and contraction of the electrodes. Because of this possible wearing or eroding of the electrodes and the gap change resulting therefrom, it is necessary to provide for a convenient and reliable adjustment mechanism.

An object of the present invention is to provide an improved device for heating liquids.

Another object of the present invention is to provide a hot water heater especially adapted for domestic use in a home and wherein said heater is a relatively small compact unit which is conveniently attachable to a source of water, such as a sink tap.

Another object of the present invention is to provide a hot water heater in which a potential on a plurality of electrodes results in an electric current passing through the water.

Another object of the present invention is to provide a hot water heater having electrodes between which water to be heated passes and in which one set of electrodes is adjustable so that the gap between electrodes may be set to provide optimum heating of water therein.

A further object of the present invention is to provide a hot water heater in which the current passing between two sets of electrodes is automatically adjusted in accordance with the pressure or volume of water passing through the heater.

Another object of the present invention is to provide electrical switching means responsive to water pressure to automatically adjust the heating current between the electrodes of an electric hot water heater.

The invention will be more fully understood from the following description taken in conjunction with the drawings, in which:

Fig. 1 is a plan view of a heater of the present invention;

Fig. 2 is a side view of the unit of Fig. 1;

Fig. 3 is a sectional view taken on line 3—3 of Fig. 1;

Fig. 4 is a sectional view taken on line 4—4 of Fig. 2;

Fig. 5 is a bottom view of the heater;

Fig. 6 is a perspective view of the heater core; and

Fig. 7 is a schematic view illustrating the electrical connections.

Referring now to the drawings, wherein like numerals refer to like parts, the heating apparatus of the present invention comprises a heater unit 10 and an electrical switching device 11. The heater unit comprises a pair of end plates 12 and 13 made of an insulating material such as slate or lava stone. A pair of end disks 14 and 15 are provided and located against the inner surfaces of said plates 12 and 13, respectively. Circular ring 16 is of rectangular cross section as shown in Fig. 3 and is positioned to sit on end disk 15. A plurality of carbon disks 17 and insulating rings 18 are alternately arranged and staggered one above the other between ring 16 and end disk 14 to form generally a cylindrical structure. Each of the circular rings 18 have cut out portions in the outer surface thereof to receive O rings 19 which provide water tight seals. A plurality of conductive bands 20, 21, 22 and 23 are positioned around the outer edge of the carbon disks 17 and between adjacent insulating rings 18. The conductive bands are preferably made of brass and of such diameter that they form a snug contact with the outer edge of the respective carbon disks along the entire circumference thereof.

It is seen from the description thus far that a cylindrical structure is made up of the alternate insulator rings 18 and conductive bands 20, 21, 22 and 23 in contact with carbon disks 17. This structure is rigidly held in place between the end disk by means of eight tie rods 24, 25, 26, 27, 28, 29, 30 and 31 which pass through each end disk 12 and 13 outside the cylindrical structure as seen in Fig. 2. Each tie rod is threaded at both ends to receive nuts 32.

The circular carbon disks 17 each have a circular opening in the center thereof through which a shaft 33 passes. The upper end of shaft 33 is received in a bushing 34 located in a central opening through plate 12 and disk 14. The bushing is flanged at the bottom to abut against the underside of disk 14, and externally threaded to receive a lock nut 35. A pair of O rings 36 and 37 insure a water tight fit between the disk 14, bushing 34 and shaft 33. The shaft serves to mount an assembly including a plurality of carbon disks which will now be described. At the lower end of the center assembly, an insulator disk 38 made of slate or lava stone is mounted on the shaft. A carbon disk 39 having a metallic insert 41 is positioned on the center shaft adjacent the disk 38. The insert 41 insures a good electrical contact between the carbon disk and shaft 33. A spacer 42 having a central hole rests on disk 39 and serves to separte the latter from insulator disk 43 which is similar to disk 38. Spacer 42 is shown in perspective in Fig. 6 and has four slots 44 which permit free flow of water as will become apparent hereinafter. Carbon disk 45 having a metallic insert 41 is mounted on the shaft 33 adjacent disk 43. Mounted in ascending order on shaft 33 is another slotted spacer 42, lava stone disk 46, carbon disk 47, a third spacer 42, lava stone disk 48 and carbon disk 49. The disks and spacers on shaft 33 are maintained in tight abutting relationship by a clip 51 which fits into a circular slot in shaft 33 and a nut 52 and washer 53 at the lower end of the shaft. It is seen that there are four carbon disks 39, 45, 47 and 49 in electrical contact with shaft 33, although a larger or less number may be used depending on the size of the device. These disks may be considered the central electrode which cooperates with the carbon disks 17 to heat the water passing therebetween. A T-shaped sheet metal conductor 54 fits under lock nut 35 and electrically connects shaft 33 with tie rods 29 and 30. Thumb nut 55 is received on the threaded end of bushing 34 and serves to permit manual vertical adjustment of shaft 33. As the shaft is raised or lowered, the distance between the carbon disks comprising the central electrode and the disks 17 is varied. This adjustment permits the operator to set the electrodes for optimum heating efficiency.

An internally threaded pipe 56 passes through openings in end plate 12 and end disk 14 to serve as the water outlet. The pipe is threaded at the inner end to receive a nut 57 and has a flanged upper end which abuts against a sheet metal conductor 58 on the upper surface of plate 12. An O ring 59 insures a water tight fit between pipe 56 and disk 14.

Reference will now be made to the electrical switching device 11 and its associated structure secured to the bottom of the heater unit 10. A hollow flow chamber 61 formed by a metal cylinder is received in a central opening in end plate 13 and secured in place by a clip 62 positioned in an enlarged part of the plate opening. Coupling device 63 fits partially within the hollow flow chamber and extends upwardly through a hole in end disk 15. The upper end of coupling device 63 is externally threaded to receive a nut 64. A pair of O rings 65 and 66 provides a water tight fit. The interior of the flow chamber is stepped in diameter to define a lower section 67 of relatively small diameter and an upper section 68 of larger diameter. A plunger 69 machined from a single piece of metal is positioned within the hollow cylinder 61 for vertical slidable movement. The upper end of the plunger has a disk shaped head 71 whose lower face is beveled. The downward movement of plunger 69 is limited by head 71 which is of larger diameter than section 67 of the flow chamber. A threaded lateral hole in cylinder 61 receives an inlet pipe 72 having a coupler 73 to which an inlet base or pipe may be connected. An actuator 74 is secured to the lower end of plunger 69 by means of screw 75. The lower face of the actuator is beveled as seen in Fig. 3. An insulator disk 76 is fastened to the cylinder 61 and mounts a pair of metallic contact bars 77 and 80 shaped as shown in Figs. 5 and 7.

It is understood that the pressure of the inlet water passing through pipe 72 and thence through the hollow flow chamber will determine the vertical position of plunger 69 and therefore the position of actuator 74. Each of the tie rods 24, 25, 26 and 27 has a contact finger 81, 82, 83 and 84, respectively, connected thereto as seen in Figs. 2, 3 and 5. The fingers extend downwardly from end plate 13 and are held in place by the tie rod nuts. The fingers are of progressively longer length and are bent outwardly at the lower ends to cooperate with actuator 74 with a camming action. In the normal position, each finger is held outwardly by the actuator which will start to rise as the water passes through the inlet pipe 73 to raise plunger 69. As the plunger moves due to the water pressure, the fingers are progressively actuated to complete electrical circuits hereinafter to be described.

Each finger has an electrical contact secured thereto which are indicated schematically in Fig. 7 as 85, 86, 87 and 88, respectively. Each of these movable contacts are positioned adjacent fixed contacts 89, 91, 92 and 93, respectively secured to contact bars 77 and 80. Each of the tie rods 24, 25, 26 and 27 to which the spring fingers are connected are in turn electrically connected to bands 23, 22, 21 and 20, respectively, by means of spring clips 94, 95, 96 and 97, respectively. The bands are in turn in contact with the carbon disks 17 which serve as the outer heater electrodes. It should be understood therefore that as the plunger 69 is actuated by the inlet water pressure, the carbon disks 17 are sequentially electrically connected to bars 77 and 80 as the four sets of stationary contacts and movable contacts close.

The bottom ends of tie rods 29 and 30 also mount two spring fingers 98 and 99 having contacts 101 and 102 and shown schematically in Fig. 7. Contacts 101 and 102 are located adjacent contacts 103 and 104, respectively, secured to actuator 74 and electrically connected to plunger 69. It is to be recalled that the tie rods 29 and 30 are electrically connected to the center set of carbon disks by conductor 54 and shaft 33.

Reference will now be made to Fig. 7 in considering the electrical arrangement of the present invention. A 110 volt source of power may be employed, or alternatively, a 220 volt source may be used. As seen in Fig. 7, there are four contact terminals A, B, C and D. When using a 110 volt source, terminals A and C are connected to ground and terminals B and D are connected to the 110 volt conductor. Thus when the water is received through the heater inlet, the plunger 69 will move actuator 74 and contacts 101, 103 and 102, 104 will close to apply ground to the center carbon electrodes over a circuit traced from grounded contact C, contacts 101, 102, tie rods 29, 30, conductor 54 and shafts 32 to disks 39, 45, 47 and 49. Movement of the plunger and actuator also causes one or more of the contacts 85, 86, 87 and 88 to engage their respective cooperating contacts on bars 77 and 80 to complete the heating circuit. If, for example, the water pressure was such that contacts 85, 89 were to close, the potential applied to contact B could be traced through bar 77, contacts 85, 89, contact finger 81, tie rod 31, spring clip 97, conductive band 20 and the upper carbon disk 17. It is seen then that the center disks are at ground potential and one or more of the outer carbon disks are connected to the 110 volt line so that an electrical current will flow through the water passing through the heater. If the volume of water increases, the added pressure will operate the plunger 69 to apply a potential to more of the carbon disks forming the outer electrode.

If a 220 volt source is used contact A is grounded and contacts B and D are connected to one side of the 220 volt line and contact C to the other side of the 220 volt line.

A third arrangement for connecting the unit would be a 220/110 volt system. In this case contacts A and C would be grounded and contact B would be connected to one side of the 220 volt line and contact D to the other side.

It is of course understood that regardless of the source potential of connecting arrangement, the flow responsive switch will operate in the same manner as above described to increase the water heating current as the water pressure increases.

Though the present invention has been described with respect to a preferred embodiment thereof, it is to be understood that this is not to be considered as limiting the invention as defined in the appended claims.

I claim:

1. An apparatus for heating fluid by electrical conduction comprising a fluid chamber having a fluid inlet pipe and an outlet pipe, said fluid chamber having a center support member, a first set of electrodes joined at the centers thereof to said support member and a second set of electrodes supported at the outer edges thereof to said chamber, the electrodes of said first and second set being parallel and alternately interleaved, means to apply an electrical potential to said first and second sets of electrodes whereby an electric current will flow through fluid passing therebetween resulting in heating thereof.

2. A hot water heater comprising a heating chamber having an inlet and an outlet, a first set of disks arranged in stacked parallel relation, a second set of disks arranged in stacked parallel relation, said first and second sets of disks being interleaved and spaced apart a predetermined distance, means to apply an electrical potential to said first set of disks and means responsive to the water pressure of the water passing into said chamber to sequentially connect the disks of said second set to said electrical potential whereby an electric current will flow through water passing between said disks to cause heating thereof.

3. A heater according to claim 2 having means for relatively spacing the disks.

4. A hot water heater comprising a heating chamber having an inlet and an outlet, a first set of carbon disks arranged in stacked parallel relation, a second set of carbon disks arranged in stacked parallel relation, said first and second sets of carbon disks being interleaved and spaced apart a predetermined distance, means to apply an electrical potential to said first and second sets of carbon disks whereby current will flow through water passing between said sets of disks and means to adjust the position of said second set of disks with respect to the first set of disks to vary the distance therebetween.

5. A hot water heater comprising a first set of carbon disks and a plurality of insulating rings alternately arranged one above the other to form a generally cylindrical heating chamber, a plurality of metallic bands, each positioned around the periphery of one of said disks and in electrical contact therewith, a center section located within the heating chamber, said center section comprising a shaft, a second set of carbon disks and a plurality of spacer means alternately arranged on said shaft whereby the carbon disks of said second set interleave with the carbon disks of said first set and means to apply an electrical potential to said first and second sets of carbon disks.

6. A hot water heater comprising a first set of carbon disks and a plurality of insulating rings alternately arranged one above the other to form a generally cylindrical heating chamber, a plurality of metallic bands, each positioned around the periphery of one of said disks and in electrical contact therewith, a center section located within the heating chamber, said center section comprising a shaft, a second set of carbon disks and a plurality of spacer means alternately arranged on said shaft whereby the carbon disks of said second set interleave with the carbon disks of said first set, means to apply an electrical potential to said first and second sets of carbon disks, and means to raise and lower said shaft to adjust the distance between the first and second sets of carbon disks.

7. A hot water heater comprising a heating chamber having an inlet and an outlet, a first set of carbon disks arranged in stacked parallel relation, a second set of carbon disks arranged in stacked parallel relation, said first and second sets of carbon disks being interleaved and spaced apart a predetermined distance, means to apply an electrical potential to said first set of carbon disks, means responsive to the water pressure of the water passing into said chamber to sequentially connect the carbon disks of said second set to said electrical potential.

8. A hot water heater comprising a heating chamber having an inlet and an outlet, a first set of carbon disks arranged in stacked parallel relation, a second set of carbon disks arranged in stacked parallel relation, said first and second sets of carbon disks being interleaved and spaced apart a predetermined distance, means to apply an electrical potential to said first and second sets of carbon disks whereby electrical current will flow through water passing therebetween, a flow responsive device including a flow chamber and means actuated by said flow responsive device to control said electrical current flowing through the water.

9. A hot water heater comprising a heating chamber, an outer electrode comprising a plurality of carbon disks arranged in stacked parallel relation, an inner electrode comprising a plurality of carbon disks arranged in stacked parallel relation, the carbon disks of said outer and inner electrodes being interleaved and spaced apart to provide a water passage, a flow responsive device including a flow chamber, means transmitting the water to be heated through said flow chamber and into said heating chamber, circuit means including an electrical switch connecting said inner electrode to a voltage supply and means responsive to said flow responsive device to selectively connect the carbon disks of said outer electrode to said voltage supply.

10. A hot water heater comprising a heating chamber, an outer electrode comprising a plurality of carbon disks arranged in stacked parallel relation, an inner electrode comprising a plurality of carbon disks arranged in stacked parallel relation, the carbon disks of said outer and inner electrodes being interleaved and spaced apart to provide a water passage, a flow responsive device including a flow chamber, means transmitting the water to be heated through said flow chamber and into said heating chamber, circuit means including an electrical switch connecting said inner electrode to a voltage supply and means responsive to said flow responsive device to sequentially connect the carbon disks of said outer electrode to said voltage supply.

11. The combination defined in claim 8 in which said flow responsive device further includes a movable plunger extending into the flow chamber and an actuator means connected to said plunger.

12. A hot water heater comprising a first set of carbon disks and a plurality of insulating rings alternately arranged one above the other to form a generally cylindrical heating chamber, a plurality of metallic bands, each positioned around the periphery of one of said disks and in electrical contact therewith, a center section located within the heating chamber, said center section comprising a shaft, a second set of carbon disks and a plurality of spacer means alternately arranged on said shaft whereby the carbon disks of said second set interleave with the carbon disks of said first set, a flow responsive device including a flow chamber, means transmitting the water to be heated through said flow chamber and into said heating chamber, circuit means including an electrical switch connecting said first and second sets of carbon disks to a voltage supply and means responsive to said flow responsive device to control the current flowing between said electrodes.

References Cited in the file of this patent

UNITED STATES PATENTS

| | | |
|---|---|---|
| 939,054 | Meyers | Nov. 2, 1909 |
| 1,037,369 | Thompson | Sept. 3, 1912 |
| 2,355,687 | Van Hise | Aug. 15, 1944 |
| 2,572,337 | Harris | Oct. 23, 1951 |
| 2,597,713 | Duprat | May 20, 1952 |